United States Patent
Basavarajappa

(10) Patent No.: US 12,509,922 B2
(45) Date of Patent: Dec. 30, 2025

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventor: Madhu Basavarajappa, Leverkusen (DE)

(73) Assignee: Kiekert AG, Heiligenhaus (DE)

( * ) Notice: Subject to any disclaimer, the term of this patent is extended or adjusted under 35 U.S.C. 154(b) by 37 days.

(21) Appl. No.: 18/699,613

(22) PCT Filed: Sep. 27, 2022

(86) PCT No.: PCT/DE2022/100714
§ 371 (c)(1),
(2) Date: Apr. 9, 2024

(87) PCT Pub. No.: WO2023/061526
PCT Pub. Date: Apr. 20, 2023

(65) Prior Publication Data
US 2025/0223847 A1    Jul. 10, 2025

(30) Foreign Application Priority Data
Oct. 12, 2021    (DE) ..................... 10 2021 126 370.0

(51) Int. Cl.
*E05B 81/06* (2014.01)
*E05B 77/26* (2014.01)
(Continued)

(52) U.S. Cl.
CPC ............ *E05B 81/06* (2013.01); *E05B 77/265* (2013.01); *E05B 81/14* (2013.01); *E05B 81/82* (2013.01); *E05B 81/90* (2013.01); *E05B 85/02* (2013.01)

(58) Field of Classification Search
CPC .......... E05B 81/06; E05B 81/14; E05B 81/82; E05B 81/90; E05B 85/02
See application file for complete search history.

(56) References Cited

FOREIGN PATENT DOCUMENTS

| DE | 10164829 B4 | 7/2006 |
|---|---|---|
| DE | 102011015669 A1 | 10/2012 |

(Continued)

OTHER PUBLICATIONS

Machine translation and numbered paragraphs for FR 2775718 A1 (Year: 1999).*

(Continued)

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock, in particular a motor vehicle door lock, which is equipped with an electromotive drive and an electric emergency power source for an emergency actuation of the drive. The emergency power source is arranged in the interior of a motor vehicle lock housing. According to the invention, the emergency power source is accommodated in an exchangeable manner in a compartment that can be closed with a detachable lid, wherein an additional power source is provided, which, after removal of the lid, transfers the emergency power source into an at least partially exposed position in relation to the motor vehicle door lock housing.

14 Claims, 2 Drawing Sheets

(51) Int. Cl.
*E05B 81/14* (2014.01)
*E05B 81/82* (2014.01)
*E05B 81/90* (2014.01)
*E05B 85/02* (2014.01)

(56) References Cited

FOREIGN PATENT DOCUMENTS

| | | | |
|---|---|---|---|
| DE | 102014105873 A1 | | 10/2015 |
| DE | 102014105875 A1 | | 10/2015 |
| DE | 102014114945 A1 | | 4/2016 |
| DE | 102018120447 A1 | | 2/2020 |
| FR | 2775718 A1 | * | 9/1999 ............. E05B 81/82 |
| FR | 3077597 A1 | | 8/2019 |
| JP | 2000064685 A | * | 2/2000 |
| WO | 2021023341 A1 | | 2/2021 |

OTHER PUBLICATIONS

Machine translation and numbered paragraphs for JP20000648685 A (Year: 2000).*
International Search Report mailed Dec. 15, 2022, for priority International Application No. PCT/DE2022/100714.

* cited by examiner

MOTOR VEHICLE LOCK, IN PARTICULAR MOTOR VEHICLE DOOR LOCK

This application is a national phase of International Patent Application No. PCT/DE2022/100714 filed Sep. 27, 2022, which claims priority to German Patent Application No. 10 2021 126 370.0 filed Oct. 12, 2021, each of which is hereby incorporated herein by reference in its entirety.

FIELD OF DISCLOSURE

The invention relates to a motor vehicle lock, in particular a motor vehicle door lock, with an electromotive drive, and with an electrical emergency power source for emergency actuation of the drive, wherein the emergency power source is arranged in the interior of a motor vehicle lock housing.

BACKGROUND OF DISCLOSURE

Motor vehicle locks, and in particular motor vehicle door locks, which have an electromotive drive, are configured and designed as electric locks by way of example and for electrically opening a locking mechanism realized inside the motor vehicle lock and consisting substantially of a rotary latch and a pawl. In principle, however, it is also possible that the electromotive drive is not (only) used to open the locking mechanism electrically, but can alternatively or additionally also be used to actuate a so-called positioning element. In principle, the electric lock can be of the type described in DE 101 64 829 B4. If, for example, the electromotive drive is to be used to actuate a positioning element, it may be designed in a similar manner to that described in DE 10 201 1 015 669 A1.

In principle, however, the electromotive drive can also be used as a component of the motor vehicle lock to actuate an actuation lever chain in the interior of the motor vehicle lock, for example to transfer it from the "locked" functional position to the "unlocked" functional position.

All of these functions can regularly only be mapped and converted if the electromotive drive is supplied with sufficient electrical energy. This electrical energy usually comes from a main energy source or an accumulator on the vehicle.

If, for example, there is a voltage drop in this main energy source or if it is damaged, the functions mentioned above in terms of "opening electrically", "turning off" or "unlocking" cannot be converted, at least no longer by electric motor. For this reason, there are already approaches in the prior art to realize an emergency energy storage or an emergency energy source.

For example, WO 2021/023341 A1 of the applicant describes a motor vehicle lock which is equipped with an electromotive drive for an actuating lever chain and in particular a locking lever chain and additionally an emergency energy store for the electrical supply of the drive in the course of an emergency actuation and in particular emergency unlocking. In the example, the emergency energy storage ensures that after an authentication check of an access-willing operator, a locking lever chain provided at this location is transferred from its "locked" position to the "unlocked" position.

The generic prior art according to DE 10 2014 105 875 A1 relates to a motor vehicle lock arrangement which is additionally equipped with an emergency supply arrangement for the voltage supply of the motor vehicle lock in emergency operation. For this purpose, the known emergency supply arrangement is arranged inside a motor vehicle lock housing. In addition, a so-called auxiliary opening drive for the motorized lifting of a pawl is implemented.

The prior art has basically proven itself with regard to the basic possibility of electrical emergency actuation of the electromotive drive as part of a motor vehicle lock. However, the electrical emergency power sources used at this point are not free of defects. In fact, the emergency power sources can basically be capacitors, batteries, etc. Such emergency power sources, like a vehicle battery as the main power source, are also subject to signs of ageing and can discharge over long periods of time in particular. In practice, this aspect is addressed by charging the respective electrical emergency power source on a regular or permanent basis. However, this does not stop the effects of ageing, which in the worst case could mean that the emergency power source is also not available to supply electrical power to the electromotive drive if the main power source or vehicle battery fails. The invention as a whole seeks to remedy this.

SUMMARY OF DISCLOSURE

The invention is based on the technical problem of providing such a motor vehicle lock, and in particular a motor vehicle door lock, which enables the emergency power source to be replaced in a simplified and routine manner.

To solve this technical problem, a generic motor vehicle lock and, in particular, a motor vehicle door lock within the scope of the invention is characterized in that the emergency power source is interchangeably accommodated in a compartment which can be closed with a detachable lid, and in that an additional (mechanical) source of force is provided which, after removal of the lid, transfers the emergency power source into an at least partially exposed position relative to the motor vehicle lock housing.

According to the invention, the emergency power source is therefore first of all interchangeably accommodated in the compartment. The compartment can be closed using the detachable lid. This makes it possible to replace the emergency power source during maintenance work, for example, or at least to check its functionality.

The replacement and checking of the emergency power source is further facilitated within the scope of the invention by the fact that the additional (mechanical) source of force is provided. With the help of the source of force, after removing the lid, the emergency power source is transferred to the at least partially exposed position. Such an exposed position corresponds to the emergency power source protruding at least partially from the compartment and thus from the motor vehicle lock housing with the aid of the source of force, making it easy for an operator, for example, to grasp it. In other words, additional measures for gripping and removing the emergency power source from the compartment accommodating it are expressly not required within the scope of the invention. Rather, the automatic assumption of the exposed and thus protruding position of the emergency power source after removal of the lid means that maintenance work on the emergency power source can be carried out quickly and efficiently.

This is because an operator or user can easily grasp the emergency power source in the area of this projection and pull it out of the compartment due to its projection relative to the compartment or the motor vehicle lock housing. Additional tools, other measures etc. are not required for this. This makes it significantly easier to replace and, in particular, check the emergency power source.

In this context, it has proven to be advantageous if the additional source of force is designed as a spring and/or gravity. In other words, in a first embodiment, a spring can be provided as a mechanical source of force, with the aid of which the emergency power source is transferred to the exposed position as soon as the lid closing the compartment has been removed. The spring in question can be arranged inside the compartment at the bottom end. It has also proven to be particularly advantageous if the spring is also designed as an electrical contact in this context.

The invention is based on the realization that when using, for example, a battery or an accumulator as an emergency power source, the negative pole often coincides with a bottom surface of the battery in question. If this battery is inserted into the compartment with its bottom surface first and hits the spring in question at the bottom end of the compartment, during this process, on the one hand, the spring is compressed and, on the other hand, it can act as a contact for the negative pole in question. After installing the battery or emergency power source in the example and closing the compartment using the detachable lid, the spring ensures that the battery is transferred to the exposed position after removing the lid.

Alternatively or additionally, gravity can also be used as an additional source of force for the emergency power source. In this case, the compartment usually has at least one vertical extension component. In other words, the compartment as a whole is oriented in the interior of the motor vehicle lock housing in such a manner that at least one vertical extension component is observed in addition to, for example, a horizontal extension component in order to describe the position and extent of the compartment.

In relation to a typical coordinate system in connection with a motor vehicle, it is therefore to be expected that the compartment is expressly not (solely) oriented in a horizontal plane, which is spanned, for example, by the transverse direction and longitudinal direction of the motor vehicle in question and thus also of the motor vehicle door lock. Rather, at least the vertical extension component is found, i.e. the compartment is also oriented in the vertical axis direction or Z direction in the interior of the motor vehicle lock housing. In most cases, the compartment is positioned at an angle in relation to the main plane of the motor vehicle lock housing. The main plane of the motor vehicle lock housing usually coincides with an X-Z plane, wherein the X direction denotes the longitudinal direction.

In any case, this specific arrangement can cause gravitational forces to act on the emergency power source in the interior of the compartment, so that when the detachable lid is removed, the emergency power source slips out of the compartment due to the gravitational forces, or at least assumes the exposed position already described above.

Furthermore, an arrangement according to the invention enables the emergency power source to be arranged in a space-saving and/or space-optimizing manner. Consequently, the emergency power source can, for example, be arranged in the lock such that the arrangement of the bearing axes of the locking mechanism components and/or the actuating mechanism are not influenced.

In addition, the design is usually such that the lid closes the compartment detachably at the top end. In other words, while the spring acting on the emergency power source is optionally implemented as a source of force at the bottom end of the compartment, the detachable lid ensures that the compartment is also closed at the top end. In most cases, the compartment is a recess or receptacle in the interior of the motor vehicle lock that is adapted to the outer contour of the emergency power source.

In this context, it has also proved useful if the detachable lid is designed in two parts, with the compartment component extending into the compartment and the housing component adapted to an opening area of the motor vehicle lock housing. The compartment component can also have a seal that closes the compartment. In this manner, the compartment, which is usually closed except for the opening area of the lock housing, is closed tightly using the detachable lid as soon as the detachable lid is fitted on the top end of the compartment. This is because the closing seal on the compartment component ensures the desired media-tight closure.

This reliably protects the emergency power source in the interior of the compartment with attached detachable lid from any moisture, dirt or dust. This significantly increases the service life of the emergency power source.

In addition, it has proven useful in this context if the housing component adapted to the opening area of the motor vehicle lock housing is equipped with latching and/or fastening means for releasable attachment to the motor vehicle lock housing. In other words, the housing component of the detachable lid ensures that the opening area of the motor vehicle lock housing is detachably and tightly closed. It has proven to be particularly advantageous if the opening area of the compartment is provided in an inlet mouth of the motor vehicle lock housing. This is because such an inlet mouth of the motor vehicle lock housing is easily accessible when the motor vehicle door is open. In fact, a body-side locking bolt or lock holder usually drives into the inlet mouth via the inlet mouth in question and can interact here with the rotary latch as part of a locking mechanism typically accommodated in the interior the motor vehicle lock housing, consisting of the rotary latch in question and a pawl.

As soon as the locking mechanism is opened, the associated motor vehicle door can also be swung out relative to the motor vehicle body and the inlet mouth is accessible. This makes it easy to remove the lid, which detachably closes the opening area, and the additional source of force ensures that the emergency power source is then transferred to the at least partially exposed position.

By attaching the detachable lid or the housing component in the inlet mouth of the motor vehicle lock housing in this way, it is also advantageously possible to additionally provide an actuating means in the inlet mouth, which can preferably be actuated manually, for example emergency actuating means for the locking mechanisms already mentioned above. The emergency actuating means can be an emergency unlocking device, for example. In general, however, it is also conceivable that the actuating means could function as an actuating means for a child safety function, anti-theft function, etc., for example.

In any case, the invention, with the compartment for accommodating the emergency power source, which is advantageously inclined in relation to the main plane of the motor vehicle lock housing and provided in the interior of the motor vehicle lock housing, in conjunction with the associated opening area of the compartment in the inlet mouth of the motor vehicle lock housing, opens up the possibility of using the inlet mouth for additional functions, in particular for the preferably manually actuatable actuating means. This can be a rotary knob which is caused to rotate, for example, with the aid of a tool, a coin, a key, etc., in order to be able to implement the functions described above, such as unlocking or locking, a child safety function, an anti-theft function, etc. In particular, the actuating means can be designed as emergency actuating means. The actuating means can then, for example, act directly or indirectly on the pawl and/or the electromotive drive. For example, the drive can be reversed such that the lock can still be locked and/or disabled in the event of a power supply failure.

As a result, a motor vehicle lock and, in particular, a motor vehicle door lock is provided which implements a functional structure such that the emergency power source arranged in the interior of the motor vehicle lock housing can be replaced and, if necessary, maintained particularly easily. This can be attributed to the fact that after removing the lid of the compartment, the emergency power source is transferred to the at least partially exposed position relative to the motor vehicle lock housing with the aid of the source of force.

If gravity or gravitational forces act on the emergency power source, the removal of the detachable lid causes the emergency power source to slip out of the compartment with the help of gravity, as it were, and can therefore be gripped and checked and, if necessary, replaced by an operator without additional tools or additional effort. These are the main advantages.

BRIEF DESCRIPTION OF DRAWINGS

In the following, the invention is explained in more detail with the aid of a drawing showing only an exemplary embodiment in the figures.

DETAILED DESCRIPTION

Figure 1:
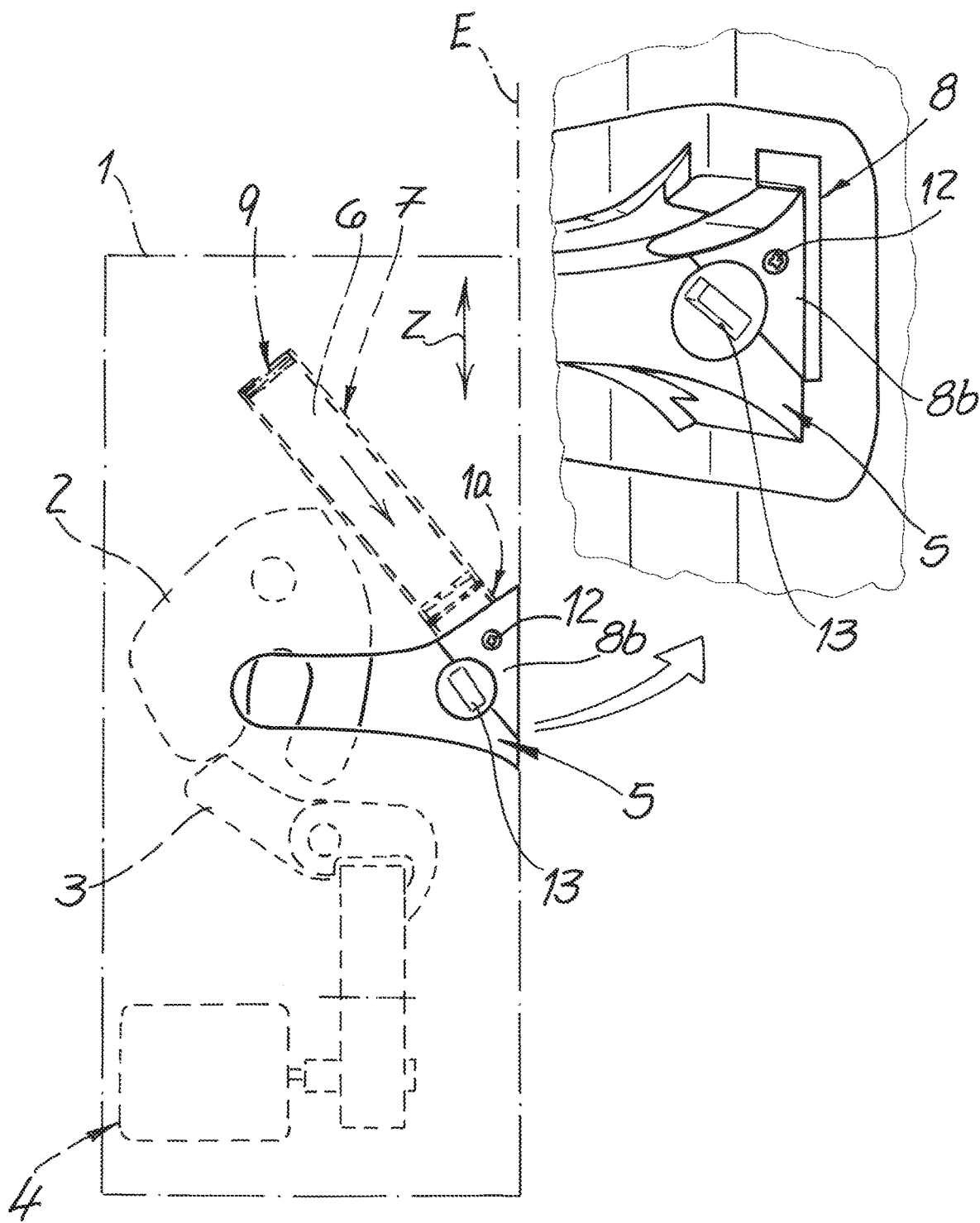
FIG. 1 shows a perspective view of the motor vehicle lock.

The figures show a motor vehicle lock, which is generally a motor vehicle door lock. The motor vehicle lock is equipped with a motor vehicle lock housing 1, which can be seen in particular in FIG. 1. In the interior of the motor vehicle lock housing 1, a locking mechanism 2, 3 consisting of a rotary latch 2 and a pawl 3 which can be brought into latching engagement therewith is provided in general and schematically, as clearly shown in FIG. 1. Merely suggested is an electric motor drive 4, with the help of which the locking mechanism 2, 3 can be opened in the exemplary embodiment. For this purpose, the electromotive drive 4 may work on the pawl 3 and lift it from its engagement with the rotary latch 2.

As a result, the rotary latch 2 opens spring-assisted or supported by rubber sealing forces, so that a locking bolt that is not explicitly shown is released. The locking bolt is actually caught by the rotary latch 2 and can move into the motor vehicle lock housing 1 via an inlet mouth 5 and interact with the rotary latch 2.

The basic structure also includes an emergency power source 6, which is provided and arranged in the interior of the motor vehicle lock housing 1 according to the exemplary embodiment. In fact, within the scope of the invention, the emergency power source 6 is interchangeably accommodated in a compartment 7 which can be closed with a detachable lid 8. The compartment 7 extends in the interior of the motor vehicle lock housing 1 and can only be opened in the area of the detachable lid 8. According to the exemplary embodiment, the emergency power source 6 is an accumulator. Of course, this is not restrictive.

Of particular importance is the fact that an additional source of force 9 is provided, which transfers the emergency power source 6 into an at least partially exposed position relative to the motor vehicle lock housing 1 after removal of the lid 8. This at least partially exposed position of the emergency power source 6 relative to the motor vehicle lock housing 1 corresponds to the fact that the emergency power source 6 simply slips out of the associated compartment 7 in the representation. This can be attributed to the fact that gravity or gravitational forces indicated by an arrow act as an additional source of force 9. In addition, a spring 9 may also be provided as a source of force, which is arranged at the bottom end of the compartment 7 and may also provide contact with the emergency power source 6.

In fact, the design is such that the emergency power source 6 or the battery realized at this point moves with its negative pole against the spring 9 in question. Since the negative pole typically coincides predominantly with a surface on the bottom end of the emergency power source 6, the spring 9 can also contact the negative pole of the emergency power source 6 during this process. In contrast, the positive pole of the emergency power source 6 is contacted via a contact surface 10 on the detachable lid 8. This contact surface 10 is in connection with spring-like contact ends in the same manner as the spring 9 on the bottom end, so that in this manner and if required, the emergency power source 6 can be charged accordingly via the associated contact ends, as indicated in FIG. 2 by corresponding poles on the terminals.

It can be seen that the compartment 7 is designed to be closed overall except for an opening area 1a in the motor vehicle lock housing 1. In addition, the lid 8 is designed in two parts, namely it has a compartment component 8a that extends into the compartment 7 and an additional housing component 8b that closes the opening area 1a of the motor vehicle lock housing 1.

According to the exemplary embodiment, the compartment component 8a is equipped not only with the contact surface 10 but also with a seal 11, which is used to close the compartment 7 as soon as the detachable lid 8 is mounted in the opening area 1a of the motor vehicle lock housing 1. For this purpose, the housing component 8b of the detachable lid 8 may be equipped with merely indicated latching and/or fastening means 12 for detachable fastening to the motor vehicle lock housing 1.

Figure 2:
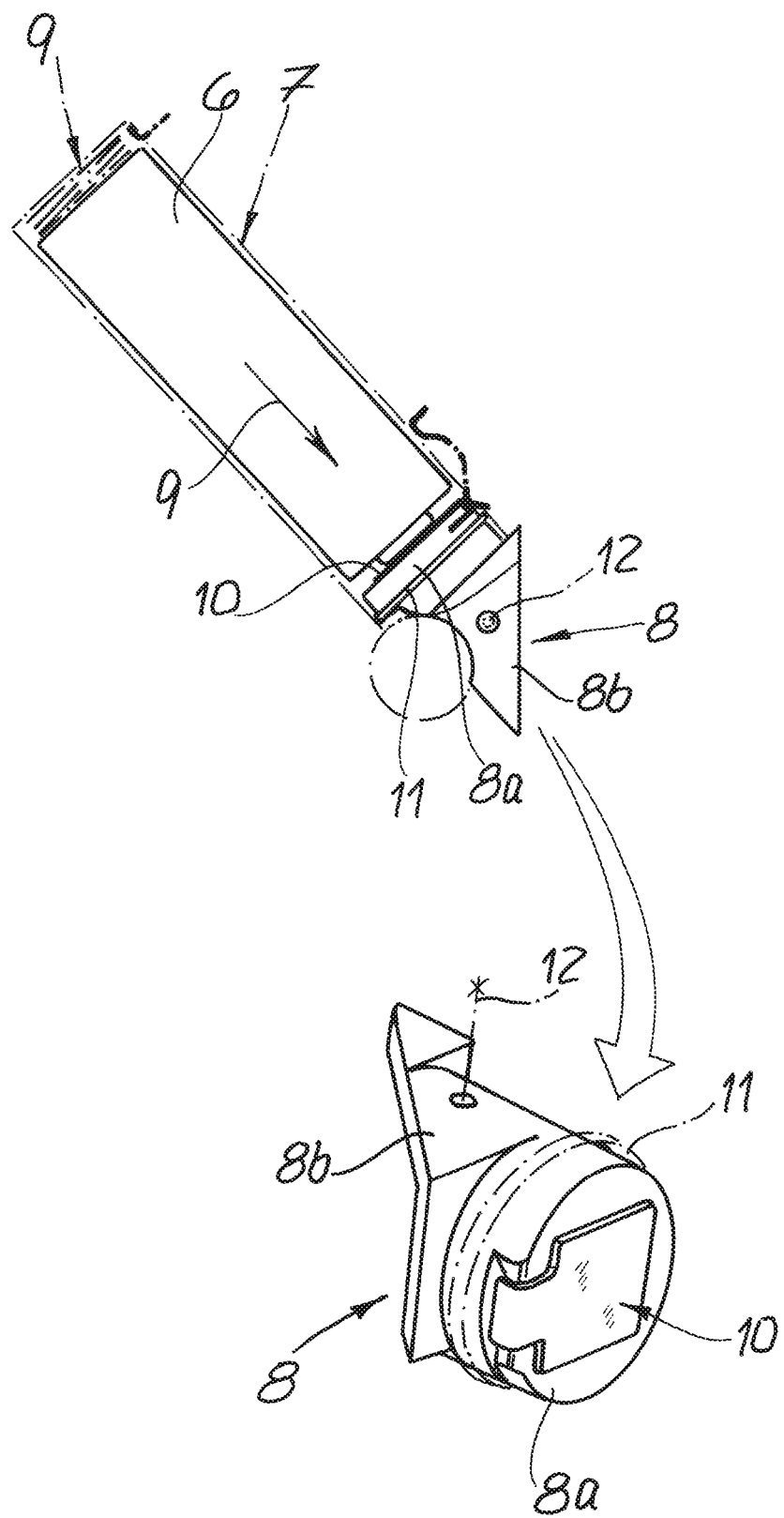
FIG. 2 schematically shows a longitudinal section through the compartment accommodating the emergency power source.

From a comparative view of FIGS. 1 and 2, it can be seen that the opening area 1a of the motor vehicle lock housing 1 is provided in the inlet mouth 5 of the motor vehicle lock housing 1. In addition, the design according to the exemplary embodiment is such that the compartment 7 has at least one vertical extension component Z and, according to the exemplary embodiment, is inclined in relation to a main plane E of the motor vehicle lock housing 1 indicated in FIG. 1. As a result, the gravitational forces 9 already referred to above act as an additional source of force 9 on the emergency power source 6 in such a manner that, after removal of the detachable lid 8, the emergency power source 6 slides out of the compartment 7 assisted by gravity.

The design according to the invention also favors the possibility that the inlet mouth 5 is additionally equipped with an actuating means 13, which can preferably be actuated manually. In the exemplary embodiment, this actuating means 13 for the motor vehicle lock or its locking mechanisms 2, 3 is a manually actuated rotary knob that can be turned using a coin or a tool, for example. This allows the motor vehicle lock in the interior of the motor vehicle lock housing 1 to be manually transferred to positions such as "child safety locked/child safety unlocked" or "anti-theft locked/anti-theft unlocked". In addition, the actuating means 13 can also be used as an emergency actuating means in such a way that it can be used to emergency unlock and/or lock the locking mechanisms 2, 3 or the motor vehicle lock as a whole.

LIST OF REFERENCE NUMBERS

Motor vehicle lock housing 1
Opening area 1a
Rotary latch 2
Locking mechanisms 2, 3
Pawl 3
Drive 4
Inlet mouth 5
Emergency power source 6
Compartment 7
Lid 8
Compartment component 8a
Source of force 9
Spring 9
Contact surface 10
Direction 11
Fastening means 12
Actuating means 13

The invention claimed is:

1. A motor vehicle lock comprising:
an electromotive drive and a locking mechanism that is operated by the electromotive drive,
an electrical emergency power source for emergency actuation of the electromotive drive, and
a motor vehicle lock housing, wherein the emergency power source is arranged in an interior of the motor vehicle lock housing,
wherein the motor vehicle lock housing includes a compartment that is closed with a detachable lid and the emergency power source is interchangeably accommodated in the compartment, and wherein an additional source of force is provided which, after removal of the detachable lid, transfers the emergency power source into an at least partially exposed position relative to the motor vehicle lock housing,
wherein the detachable lid includes a housing component adapted to an opening area of the motor vehicle lock housing, and
wherein the opening area of the motor vehicle lock housing is provided in an inlet mouth of the motor vehicle lock housing that receives a locking bolt for interaction with the locking mechanism.

2. The motor vehicle lock according to claim 1, wherein the additional source of force is a spring.

3. The motor vehicle lock according to claim 1, wherein the compartment extends in at least a vertical direction.

4. The motor vehicle lock according to claim 3, wherein the compartment is inclined in relation to a main plane of the motor vehicle lock housing.

5. The motor vehicle lock according to claim 1, wherein the detachable lid detachably closes the compartment on a top end of the compartment.

6. The motor vehicle lock according to claim 1, wherein the detachable lid further includes a compartment component extending into the compartment.

7. The motor vehicle lock according to claim 6, wherein the compartment component has a seal that seals the compartment when the compartment is closed by the detachable lid.

8. The motor vehicle lock according to claim 1, wherein the housing component is equipped with a latch or fastener for releasable fastening of the detachable lid to the motor vehicle lock housing.

9. The motor vehicle lock according to claim 1, wherein a manual actuator is additionally provided in the inlet mouth for acting on the locking mechanism to lock or unlock the locking mechanism.

10. The motor vehicle lock according to claim 9, wherein the manual actuator includes a rotary knob.

11. The motor vehicle lock according to claim 2, wherein the spring is positioned on a bottom end of the compartment opposite from the detachable lid.

12. The motor vehicle lock according to claim 2, wherein the spring is an electrical contact for the emergency power source.

13. The motor vehicle lock according to claim 12, wherein the detachable lid is a second electrical contact for the emergency power source.

14. The motor vehicle lock according to claim 1, wherein the additional source of force is gravity.

* * * * *